United States Patent
Han et al.

(10) Patent No.: US 12,211,235 B2
(45) Date of Patent: Jan. 28, 2025

(54) VEHICLE, CONTROL METHOD OF VEHICLE, AND VEHICLE DRIVING CONTROL METHOD

(71) Applicants: Hyundai Motor Company, Seoul (KR); Kia Corporation, Seoul (KR)

(72) Inventors: Jihee Han, Seoul (KR); Junsik An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 46 days.

(21) Appl. No.: 18/216,910

(22) Filed: Jun. 30, 2023

(65) Prior Publication Data
US 2024/0169587 A1   May 23, 2024

(30) Foreign Application Priority Data

Nov. 18, 2022 (KR) .................. 10-2022-0155510

(51) Int. Cl.
| | |
|---|---|
| *G06T 7/80* | (2017.01) |
| *B60W 60/00* | (2020.01) |
| *G06T 7/70* | (2017.01) |
| *G06V 20/58* | (2022.01) |
| *H04N 17/00* | (2006.01) |

(52) U.S. Cl.
CPC .............. *G06T 7/80* (2017.01); *G06T 7/70* (2017.01); *H04N 17/002* (2013.01); *B60W 60/00* (2020.02); *B60W 2420/403* (2013.01); *G06T 2207/20081* (2013.01); *G06T 2207/30244* (2013.01); *G06T 2207/30252* (2013.01); *G06V 20/58* (2022.01)

(58) Field of Classification Search
CPC ... G06T 7/70; G06T 7/80; G06T 2207/30244; G06T 2207/30252; G06T 2207/20081; H04N 17/002; B60W 60/00; B60W 2420/403; G06V 20/58
See application file for complete search history.

(56) References Cited

U.S. PATENT DOCUMENTS

| | | |
|---|---|---|
| 10,501,059 B2 | 12/2019 | Matsuo et al. |
| 10,546,380 B2 | 1/2020 | Tanaka |
| 10,829,044 B2 | 11/2020 | Tatara et al. |
| 11,192,500 B2 | 12/2021 | Rathi et al. |
| 11,373,389 B2 * | 6/2022 | Ge .................. G06T 7/11 |

(Continued)

FOREIGN PATENT DOCUMENTS

| | | |
|---|---|---|
| JP | 2016-149613 A | 8/2016 |
| JP | 2017-032483 A | 2/2017 |

(Continued)

*Primary Examiner* — Brian P Yenke
(74) *Attorney, Agent, or Firm* — Banner & Witcoff, Ltd.

(57) ABSTRACT

A control method of a vehicle may include: performing a calibration of a plurality of cameras mounted on a vehicle to obtain a parameter of each of the plurality of cameras; generating, based on the obtained parameter, a plurality of distance value tables representing a projection relationship between pixel coordinates in an image of each of the plurality of cameras and actual coordinates in surrounding area of the vehicle; calculating, based on the plurality of distance value tables, an accuracy of actual distance coordinates included in the plurality of distance value tables for a specific area; and generating an accuracy map representing a distribution of the accuracy.

20 Claims, 9 Drawing Sheets

(56) References Cited

U.S. PATENT DOCUMENTS

| | | | |
|---|---|---|---|
| 11,860,640 B2 * | 1/2024 | Motoyama | G05D 1/0274 |
| 2019/0271550 A1 * | 9/2019 | Breed | G01C 21/3848 |
| 2021/0327092 A1 * | 10/2021 | Jiang | H04N 13/282 |
| 2021/0397857 A1 * | 12/2021 | Liu | G06V 20/58 |
| 2022/0075039 A1 * | 3/2022 | Son | G01S 17/36 |
| 2022/0111839 A1 * | 4/2022 | Jiang | G06T 7/593 |
| 2022/0276360 A1 | 9/2022 | Ma et al. | |
| 2022/0390591 A1 * | 12/2022 | Long | G01S 13/867 |
| 2023/0060526 A1 * | 3/2023 | Lee | G01S 13/89 |
| 2023/0138686 A1 * | 5/2023 | Shaag | G06T 7/80 |
| | | | 701/301 |
| 2023/0230366 A1 * | 7/2023 | Choi | G06V 10/454 |
| | | | 382/157 |
| 2023/0306639 A1 * | 9/2023 | Han | H04N 17/002 |
| 2023/0351769 A1 * | 11/2023 | Wu | G06V 10/762 |
| 2023/0356743 A1 * | 11/2023 | Wang | G06V 20/588 |
| 2024/0296621 A1 * | 9/2024 | Teranishi | G06T 7/80 |

FOREIGN PATENT DOCUMENTS

| | | |
|---|---|---|
| JP | 2017-96777 A | 6/2017 |
| JP | WO2018030285 A1 | 6/2019 |
| JP | 2021016103 A | 2/2021 |
| JP | 2022-510924 A | 1/2022 |
| WO | 2020006378 A1 | 1/2020 |
| WO | 2021/010356 A1 | 1/2021 |

\* cited by examiner

610: RESULT OF DEEP LEARNING IMAGE RECOGNITION

620: DISTANCE VALUE TABLE

630: ACTUAL DISTANCE COORDINATES

710: IMAGE OF THIRD CAMERA (LEFT)

730: ACCURACY MAP FOR EACH PIXEL OF IMAGE OF THIRD CAMERA (LEFT)

720: ACCURACY CALCULATION

VEHICLE, CONTROL METHOD OF VEHICLE, AND VEHICLE DRIVING CONTROL METHOD

CROSS-REFERENCE TO RELATED APPLICATION

This application is based on and claims priority to Korean Patent Application No. 10-2022-0155510, filed on Nov. 18, 2022 in the Korean Intellectual Property Office, the disclosure of which is incorporated herein by reference.

TECHNICAL FIELD

The disclosure relates to a vehicle that may recognize an object in an image capturing surroundings of the vehicle.

BACKGROUND

For driving assist control and autonomous driving control, types and locations of objects located around a vehicle are required to be accurately recognized. Accordingly, a variety of sensors and imaging devices mounted on a vehicle are used to recognize objects around the vehicle.

An accuracy of driving assist control and autonomous driving control may be higher by precisely recognizing a position of an object by such sensors and imaging devices for object recognition.

SUMMARY

Examples of the disclosure provide a vehicle, a control method thereof, and a vehicle driving control method that may recognize an object around the vehicle more accurately.

Additional examples of the disclosure will be set forth in part in the description which follows and, in part, will be obvious from the description, or may be learned by practice of the disclosure.

The present disclosure relates to a method for controlling a vehicle. The method may comprise performing a calibration of a plurality of cameras mounted on the vehicle to obtain a parameter of each of the plurality of cameras; generating, based on the obtained parameter, a plurality of distance value tables representing a projection relationship between: pixel coordinates in an image of each of the plurality of cameras; and actual coordinates in surrounding area of the vehicle; and calculating, based on the plurality of distance value tables, an accuracy of actual distance coordinates included in the plurality of distance value tables for a specific area, and generating an accuracy map representing a distribution of the accuracy.

An overlapping area of each of the plurality of cameras may be recognized based on the calibration, and the accuracy may be calculated on the overlapping area of each of the plurality of cameras.

The method may further comprise calculating an accuracy of a distance value table for an overlapping area formed by a first camera and a second camera in a form of conditional probability as follows: P (first accuracy, second accuracy|actual distance)=P (first accuracy|actual distance)*P (second accuracy|actual distance), wherein the first camera may have the first accuracy and the second camera may have the second accuracy.

An accuracy of each of the plurality of cameras may be modeled by a Gaussian distribution having a mean and a variance of images of the respective camera.

The parameter of each of the plurality of cameras may be a pose parameter according to an installation location and an installation orientation of each of respective camera.

The image of each of the plurality of cameras may be an image where recognition of an object located in the image has been completed.

The object may be a single object located in an overlapping area of images of at least two cameras of the plurality of cameras.

A size of the image of each of the plurality of cameras, a size of each of the plurality of distance value tables, and a size of the accuracy map may be equal to each other.

According to the disclosure, a vehicle may include: a plurality of cameras of the vehicle to capture surroundings of the vehicle; and a controller configured to: perform a calibration of the plurality of cameras to obtain a parameter of each of the plurality of cameras, generate, based on the obtained parameter, a plurality of distance value tables representing a projection relationship between: pixel coordinates in an image of each of the plurality of cameras; and actual coordinates in surrounding area of the vehicle, calculate, based on the plurality of distance value tables, an accuracy of actual distance coordinates included in the plurality of distance value tables for a specific area, and generate an accuracy map representing a distribution of the accuracy.

The controller may be configured to: recognize, based on the calibration, an overlapping area of each of the plurality of cameras; and calculate the accuracy on the overlapping area of each of the plurality of cameras.

The controller may be further configured to calculate an accuracy of a distance value table for an overlapping area formed by a first camera and a second camera in a form of conditional probability as follows: P (first accuracy, second accuracy|actual distance)=P (first accuracy|actual distance)*P (second accuracy|actual distance), wherein the first camera may have the first accuracy and the second camera may have the second accuracy.

An accuracy of each of the plurality of cameras may be modeled by a Gaussian distribution having a mean and a variance of images of the respective camera.

The parameter of each of the plurality of cameras may be a pose parameter according to an installation location and an installation orientation of each respective camera.

The image of each of the plurality of cameras may be an image where recognition of an object located in the image has been completed.

The object may be a single object located in an overlapping area of images of at least two cameras of the plurality of cameras.

A size of the image of each of the plurality of cameras, a size of each of the plurality of distance value tables, and a size of the accuracy map may be equal to each other.

According to the disclosure, a vehicle driving control method may include: recognizing an object in an image captured by a plurality of cameras; determining a location of the recognized object based on an accuracy map; and generating a control signal for controlling driving of the vehicle based on the location of the recognized object, wherein the accuracy map represents a distribution of an accuracy of actual distance coordinates included in a plurality of distance value tables for a specific area, the plurality of distance value tables representing a projection relationship between: pixel coordinates in the image captured by the plurality of cameras; and actual coordinates in surrounding area of the vehicle.

The image captured by the plurality of cameras may be an image where the recognizing the object in the image has been completed.

The recognized object may be a single object located in an overlapping area of images captured by at least two cameras of the plurality of cameras.

A size of the image of each of the plurality of cameras, a size captured by the plurality of distance value tables, and a size of the accuracy map may be equal to each other.

As is apparent from the above, a vehicle, a control method thereof, and a vehicle driving control method may recognize an object around the vehicle more accurately.

BRIEF DESCRIPTION OF THE DRAWINGS

These and/or other features of the disclosure will become apparent and more readily appreciated from the following description of examples, taken in conjunction with the accompanying drawings of which.

DETAILED DESCRIPTION

Figure 1:
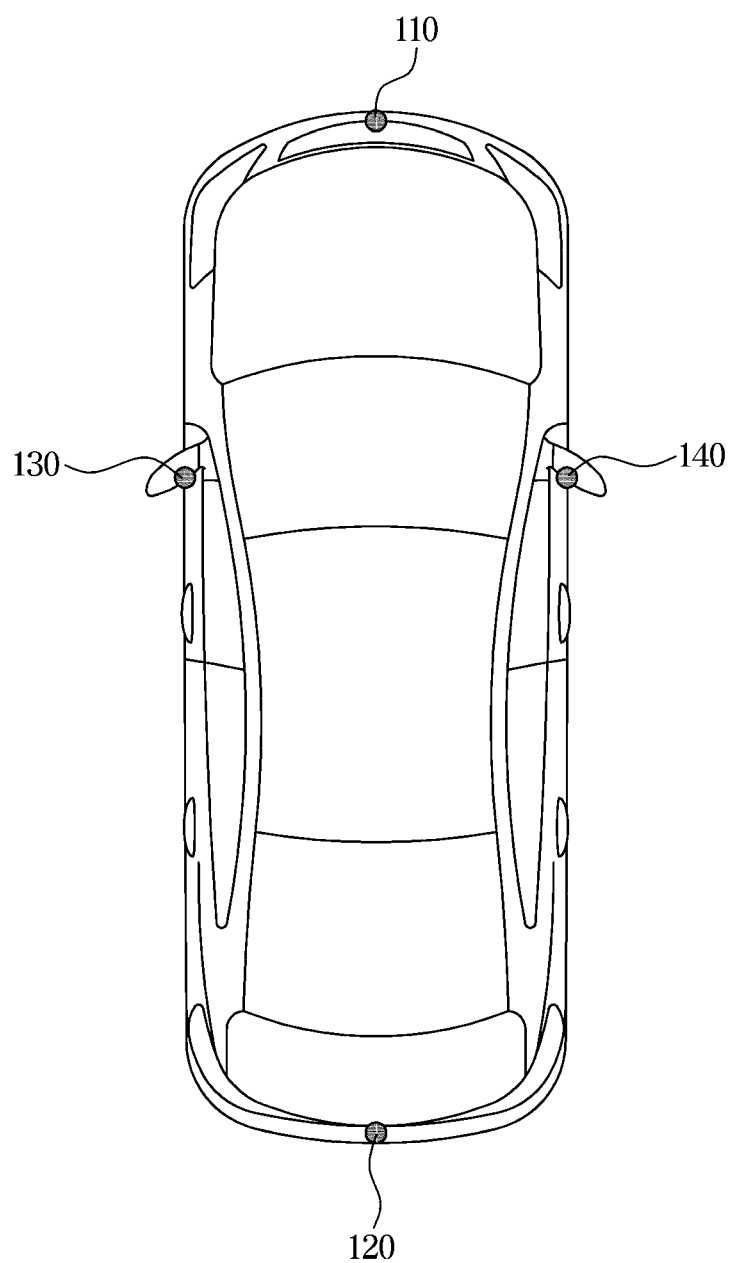
FIG. 1 shows an example of a vehicle.

Like reference numerals throughout the specification denote like elements. Also, this specification does not describe all the elements according to examples of the disclosure, and descriptions well-known in the art to which the disclosure pertains or overlapped portions are omitted. The terms such as "~part", "~module", and the like may refer to at least one process processed by at least one hardware or software. According to examples, a plurality of "~parts", "~modules" may be embodied as a single element, or a single of a "~part", "~module" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, examples of the disclosure are described in detail with reference to the accompanying drawings.

FIG. 1 shows an example of a vehicle.

In FIG. 1, a plurality of cameras 110, 120, 130, and 140 may constitute a surround view monitor (SVM) camera 150. The first camera (front) 110 may be installed to capture a front of a vehicle 100. The second camera (rear) 120 may be installed to capture a rear of the vehicle 100. The third camera (left) 130 may be installed to capture a left side of the vehicle 100. The fourth camera (right) 140 may be installed to capture a right side of the vehicle 100. The third camera (left) 130 may be installed inside a left outside mirror of the vehicle 100. The fourth camera (right) 140 may be installed inside a right outside mirror of the vehicle 100.

The SVM camera 150 configured as above may generate a 360-degree angle of view image by capturing surroundings of the vehicle 100 by the plurality of cameras 110, 120, 130, and 140.

Figure 2:
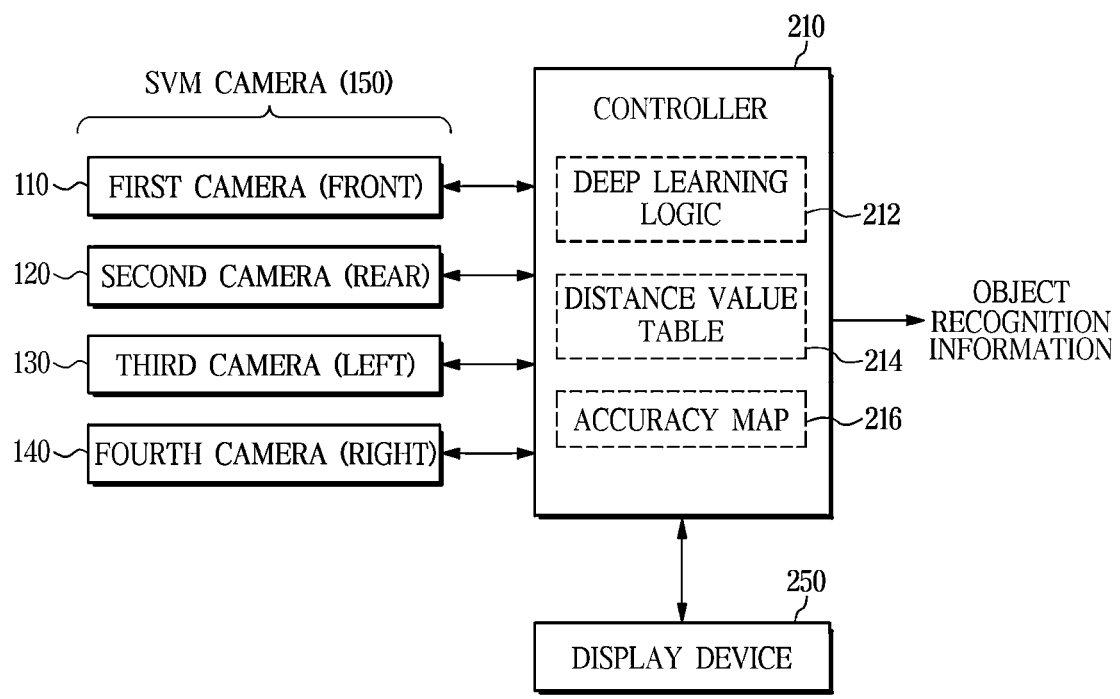
FIG. 2 shows an example of a control system of a vehicle.

FIG. 2 shows an example of a control system of a vehicle.

A controller 210 may be an electronic control unit (ECU) controlling an operation of the vehicle 100.

The controller 210 may be communicatively connected to the SVM camera 150 described with reference to FIG. 1.

An image generated in each of the SVM camera 150 may be displayed on a display device 250 through the controller 210, thereby allowing a driver to visually confirm surroundings of the vehicle 100. Also, the generated image may be used to recognize an object located in the image such as pedestrians, other vehicles, obstacles, buildings, and/or the like, for example, through deep learning image recognition. Furthermore, object recognition information (a type and a location of an object) of the recognized object in the image may be used for driving assist control, autonomous driving control, and/or the like. To this end, a deep learning logic 212 may be provided in the controller 210.

A distance value table 214 and an accuracy map 216 may be further provided in the controller 210. The distance value table 214 and the accuracy map 216 may be provided to more accurately recognize a location of an object in an image captured by the SVM camera 150. The distance value table 214 and the accuracy map 216 are described in detail with reference to FIGS. 3 to 7C.

The controller 210 may be implemented as a memory (not shown) that stores an algorithm for controlling operations of constituent components of the vehicle or data about a program that reproduces the algorithm, and a processor (not shown) that performs the above-described operations using the data stored in the memory. For example, the memory and the processor may be provided as one chip, or provided as separate chips.

A wired communication module may include various wired communication modules such as a controller area network (CAN) communication module, a local area network (LAN) module, wide area network (WAN) module, value added network (VAN) module, and/or the like, and also may include various cable communication modules such as a universal serial bus (USB), high definition multimedia interface (HDMI), digital visual interface (DVI), recommended standard 232 (RS-232), power line communication, plain old telephone service (POTS), and/or the like.

A storage may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto. The storage may be a memory provided separately from the processor described above, or a memory provided integrally with the processor.

The display device 250 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and/or the like, without being limited thereto.

An input device may include a hardware device such as various buttons or switches, a pedal, a keyboard, a mouse, a track-ball, various levers, a handle, a stick, and/or the like.

The input device may also include a graphical user interface (GUI) such as a touch pad, i.e., a software device. The touch pad may be implemented as a touch screen panel (TSP) and form a mutual layer structure with the display device 250.

When implemented as the touch screen panel (TSP) having the mutual layer structure with the touch pad, the display device 250 may be used as the input device as well.

At least one constituent component may be added or omitted corresponding to the performance of the constituent components of the vehicle illustrated in FIG. 2. Also, it will be easily understood by those skilled in the art that mutual positions of the constituent components may be modified corresponding to the performance or structure of the system.

Meanwhile, each of the constituent components shown in FIG. 2 refers to a software component and/or a hardware component such as field-programmable gate array (FPGA) and application specific integrated circuit (ASIC).

Figure 3:
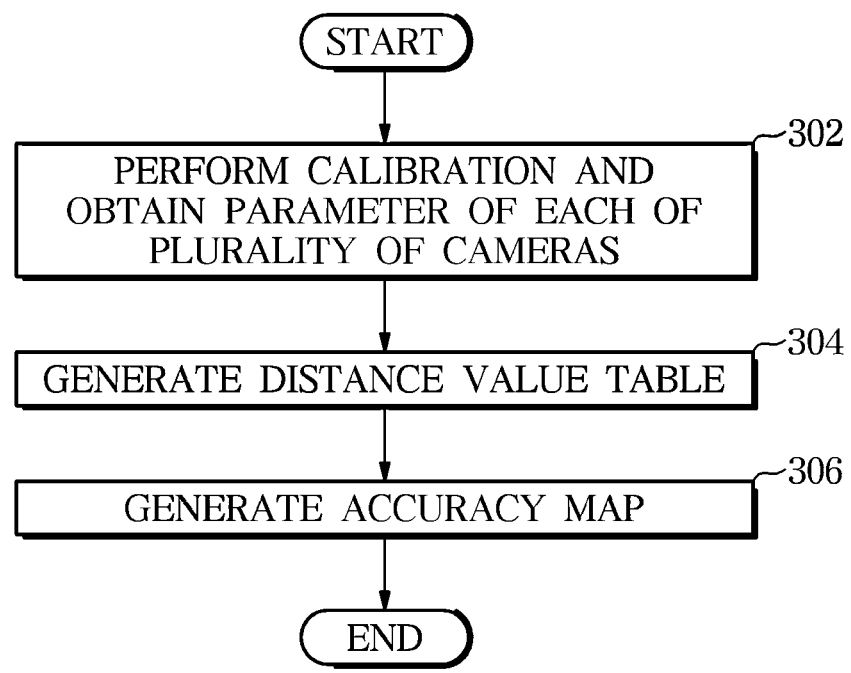
FIG. 3 shows an example of a flowchart showing steps of a method for generating an accuracy map of a vehicle.

FIG. 3 shows an example of a flowchart showing steps of a method for generating an accuracy map of a vehicle. The method for generating an accuracy map of FIG. 3 may be performed at a reference step which may be an end of line of vehicle manufacturing. The reference step may be a step of performing calibration of measuring devices such as sensors, cameras, radars, a laser imaging, detection, and ranging (lidar), and/or the like, mounted on the vehicle.

The controller 210 may obtain a pose parameter of each of the plurality of cameras 110, 120, 130, and 140 through calibration of the SVM camera 150 (302).

Figure 4:
FIG. 4 shows an example of a result of deep learning image recognition of an image of a dummy (pedestrian dummy) located in a preset position and captured by one of surround view monitor camera.

For example, in a state where a preset object is placed at a preset location around the vehicle 100, the preset object may be captured by each of the plurality of cameras 110, 120, 130, and 140, deep learning image recognition may be performed on the captured image, and pixel position (x coordinate value and y coordinate value) of the object may be measured in the image where the deep learning image recognition has been completed. FIG. 4 shows an example of a result of deep learning image recognition of an image of a dummy (pedestrian dummy, 410) located in a preset location and captured by one of the SVM camera 150. As shown in FIG. 4, the pedestrian dummy 410 may be located at a position corresponding to pixel coordinates <380, 210> in the image.

Referring again to FIG. 3, the controller 210 may obtain information about overlapping areas (photographed overlapping areas) of each of the plurality of cameras 110, 120, 130, and 140 constituting the SVM camera 150 during calibration. In order to ensure that no area is missing in the captured images, a position and a direction (orientation) of each of the plurality of cameras 110, 120, 130, and 140 are determined so that the areas (angle of view) captured by each of the plurality of cameras 110, 120, 130, and 140 may be overlapped (e.g., at least partially or fully).

Figure 5:
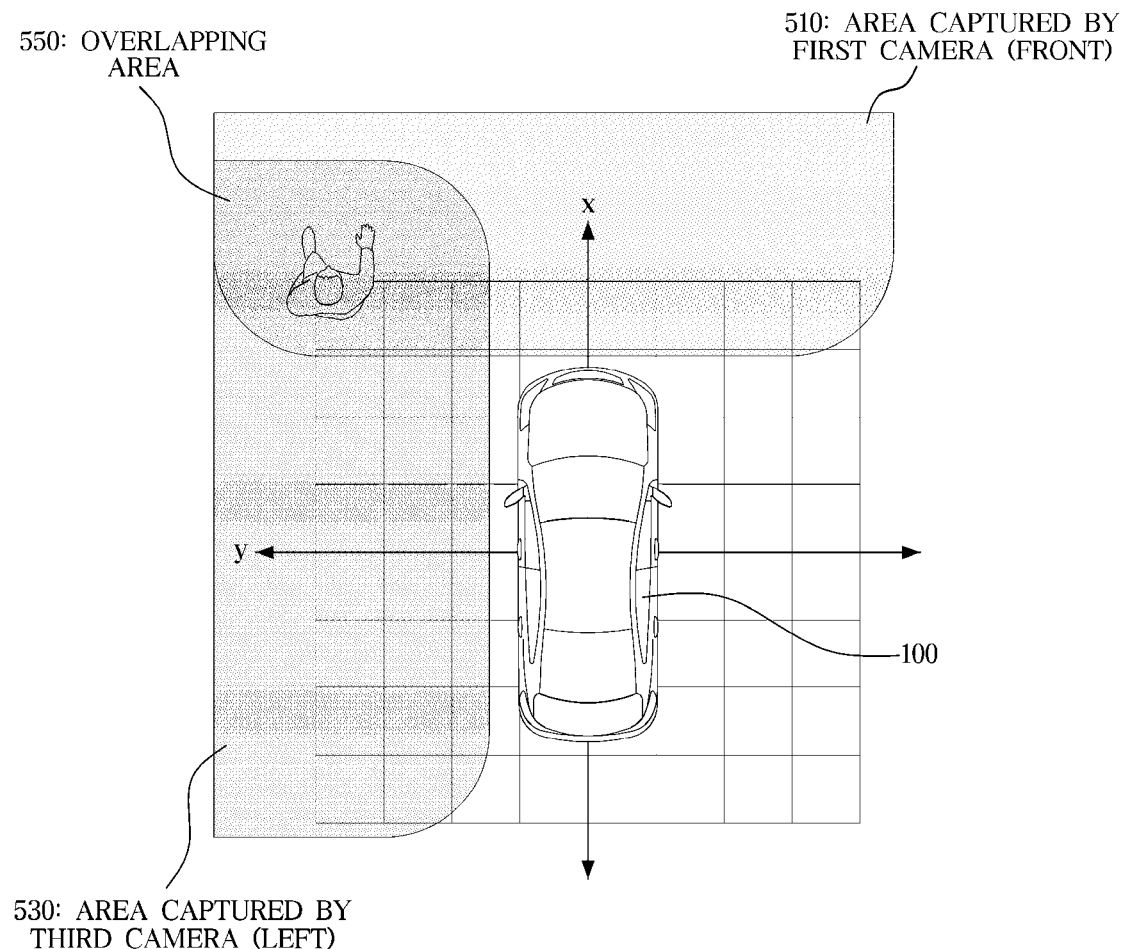
FIG. 5 shows an example of overlapping areas of a plurality of cameras constituting a surround view monitor camera.
Figure 5:
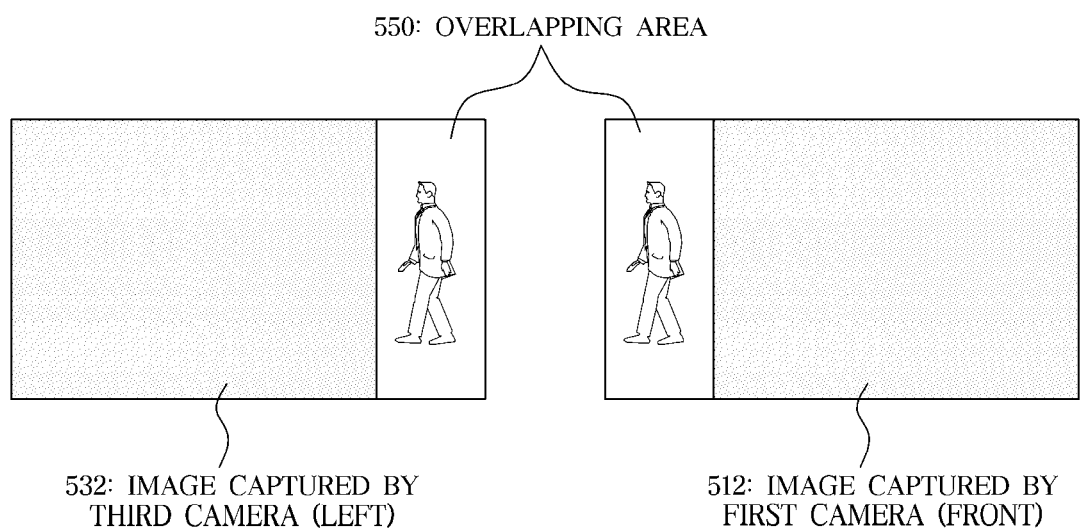

FIG. 5 show an example of overlapping areas of the plurality of cameras 110, 120, 130, and 140 constituting the SVM camera 150.

In FIG. 5, an area (angle of view) 510 may be an area captured by the first camera (front) 110 of the SVM camera 150, and an area (angle of view) 530 may be an area captured by the third camera (left) 130 of the SVM camera 150. An overlapping area 550 may be an area (angle of view) where the area captured by the first camera 110 and the area captured by the third camera 130 are overlapped (e.g., at least partially or fully). An image 532 may be an image captured by the third camera (left) 130, and an image 512 may be an image captured by the first camera (front) 110. In the image 532 captured by the third camera 130, a pedestrian may be located at a right end, but, in the image 512 captured by the first camera 110, a pedestrian may be located at a left end. As such, even though pedestrians exist in each of the two images 512 and 532, the two pedestrians are a single person (same object). In the above-described reference step of the disclosure, pixel coordinates in the image of the overlapping area of the plurality of cameras 110, 120, 130, and 140 may be acquired.

Referring again to FIG. 3, the controller 210 generates a distance value table using a parameter obtained through calibration (304).

A 'distance value' of the distance value table represents a projection relationship between pixel coordinates in the image of each of the plurality of cameras 110, 120, 130, and 140 and actual coordinates (x, y, z) having a specific location of the vehicle as an origin. The distance value table is provided in a table form by calculating the projection relationship in advance. Accordingly, by using the distance value table, it may be identified where an actual position around the vehicle 100 corresponding to a specific position in an image is. For reference, for preparing the distance value table, a pixel position in an image may be limited to the ground (z=0 in x, y, z).

Figure 6:
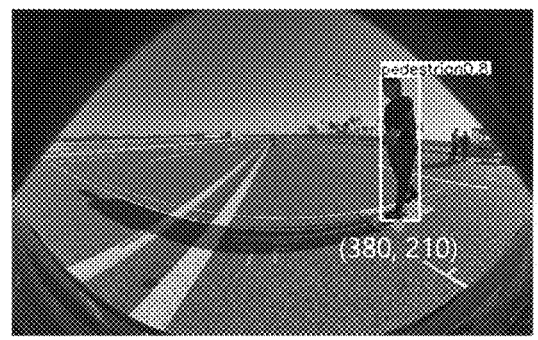
FIG. 6 shows an example of actual distance calculation (conversion) using a distance value table.
Figure 6:
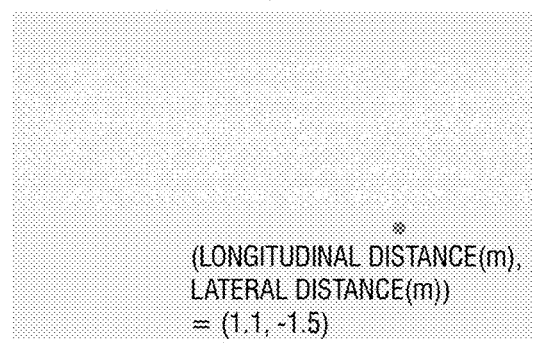
Figure 6:
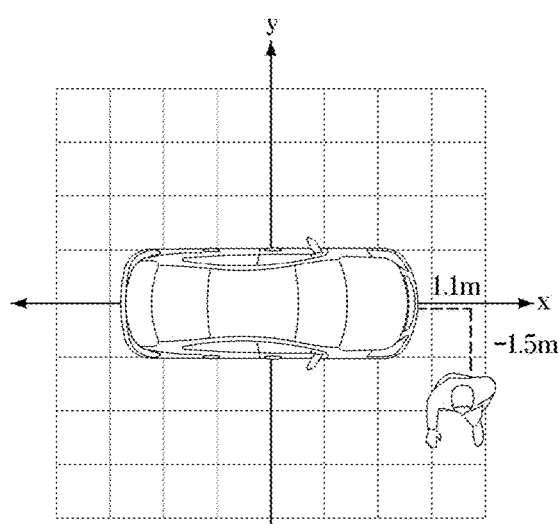

FIG. 6 shows an example of actual distance calculation (conversion) using a distance value table. As shown in FIG. 6, if an object such as a pedestrian is recognized in a result 610 of deep learning image recognition of an image captured by one of the plurality of cameras 110, 120, 130, and 140, a location of the recognized object may be obtained in a form of pixel coordinates. For example, the pixel coordinates are <380, 210> in FIG. 6. By substituting the pixel coordinates into a distance value table 620 provided in advance, actual distance coordinates 630 corresponding to the pixel coordinates <380, 210> may be calculated (converted). According to the distance value table 620, the actual distance coordinates 630 corresponding to the pixel coordinates <380, 210> are <1.1, −1.5>. Here, '1.1' represents a location 1.1 meters away from a reference origin of the vehicle 100 in a longitudinal direction, and '−1.5' represents a location 1.5 meters away from the reference origin of the vehicle 100 in a lateral direction.

The distance value table 620 may be generated by each of the plurality of cameras 110, 120, 130, and 140. For example, for the SVM camera 150 including the four cameras, four distance value tables may be provided. For example, the distance value tables of the plurality of cameras 110, 120, 130, and 140 may be integrated into one integrated distance value table, and actual distance values of all of the plurality of cameras 110, 120, 130, and 140 are calculated (converted) by using the one integrated distance value table.

If the distance value table 620 of each of the plurality of cameras 110, 120, 130, and 140 is prepared, the controller 210 may generate an accuracy map based on the plurality of distance value tables (306).

The accuracy map represents a distribution of an area-specific accuracy of each element (actual distance coordinates) of the plurality of distance value tables in a form of map. For example, if a plurality of recognition results for the same object exist as a result of performing deep learning image recognition on a captured image, actual distance coordinates may be calculated by reflecting an accuracy of each of the plurality of recognition results through the accuracy map. The above-described distance value table is obtained by using a camera parameter, and because a calibration model itself is an approximate model, a calibration error may occur when obtaining an optimal approximate solution. The distance value tables may have different accuracies due to the calibration error. For example, for wide-angle lens, distortion caused by the wide-angle lens may be greater in a periphery of the image. Also, in an image-based distance value table, an error may occur when expressing an actual distance in units of image pixels. The accuracy map may be used for correcting such errors. A size of an original image, a size of a distance value table, and a size of an accuracy map may be equal to each other.

For example, the accuracy map may be generated as below.

The controller 210 may generate reference database to generate the accuracy map.

The reference database may be a database of results of comparing a distance value table-based estimated distance with an actual distance which may be obtained by measuring a distance to an arbitrary object from the vehicle 100, in a state where the arbitrary preset object (e.g., a pedestrian dummy) is placed within a target photographing area. For example, after estimating an actual distance to an arbitrary object whose actual distance from the vehicle 100 is already known by referring to a distance value table, the two values (the already known actual distance and the estimated actual distance) may be compared, thereby calculating an accuracy of each point in a target photographing area. It may be determined that the smaller a difference between the known actual distance and the estimated actual distance, the higher an accuracy of a corresponding point. By contrary, it may be determined that the larger the difference between the known actual distance and the estimated actual distance, the lower the accuracy of the corresponding point. For example, a longitudinal distance and a lateral distance may be required to be calculated separately for higher accuracy.

The controller 210 may divide a target photographing area of each of the plurality of cameras 110, 120, 130, and 140 into a plurality of areas based on a predetermined distance, may secure the above-described reference database for each of the divided areas, and then may calculate a distribution of an accuracy for each of the areas in overlapping areas of the plurality of cameras 110, 120, 130, and 140.

Figure 7A:
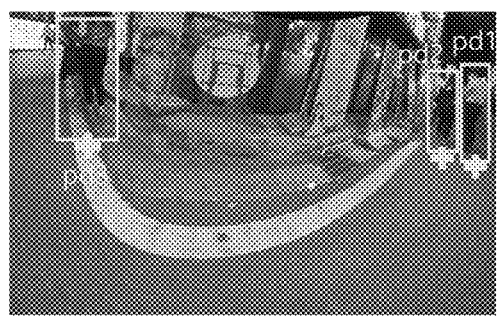
FIG. 7A shows an example of accuracy calculation by a vehicle.
Figure 7A:
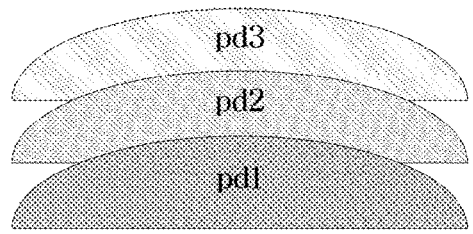
Figure 7A:
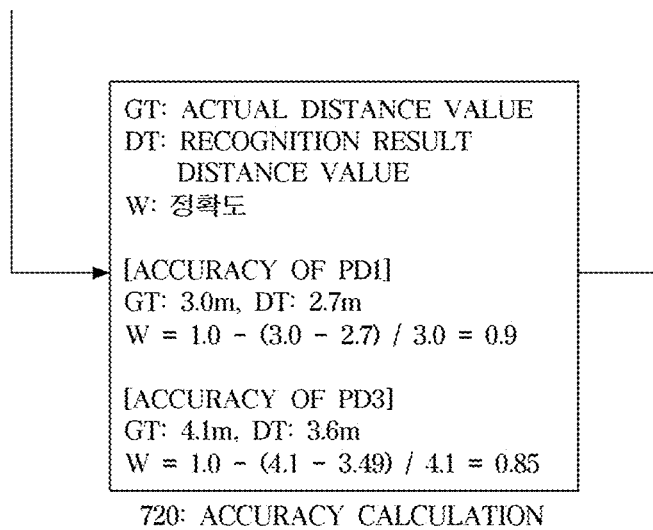

FIG. 7A shows an example of accuracy calculation by a vehicle. In FIG. 7A, illustrated are a result of deep learning recognition on an image 710 captured by the third camera (left) 130, an example 720 of accuracy calculation, and an accuracy map 730 for each pixel. The three sectioned areas pd1, pd2 and pd3 are shown in the image 710.

An accuracy of each of the areas pd1 and pd3 may be calculated as shown in the example 720 of FIG. 7A. For the area pd1, an actual distance value GT is 3.0 meters, a recognition result distance value DT is 2.7 meters, and in this example, an accuracy W is 0.9. For the area pd3, an actual distance value GT is 4.1 meters, a recognition result distance value DT is 3.6 meters, and in this example, an accuracy W is 0.85. For example, the accuracy of the area pd1 may be relatively higher than that of the area pd3.

Figure 7B:
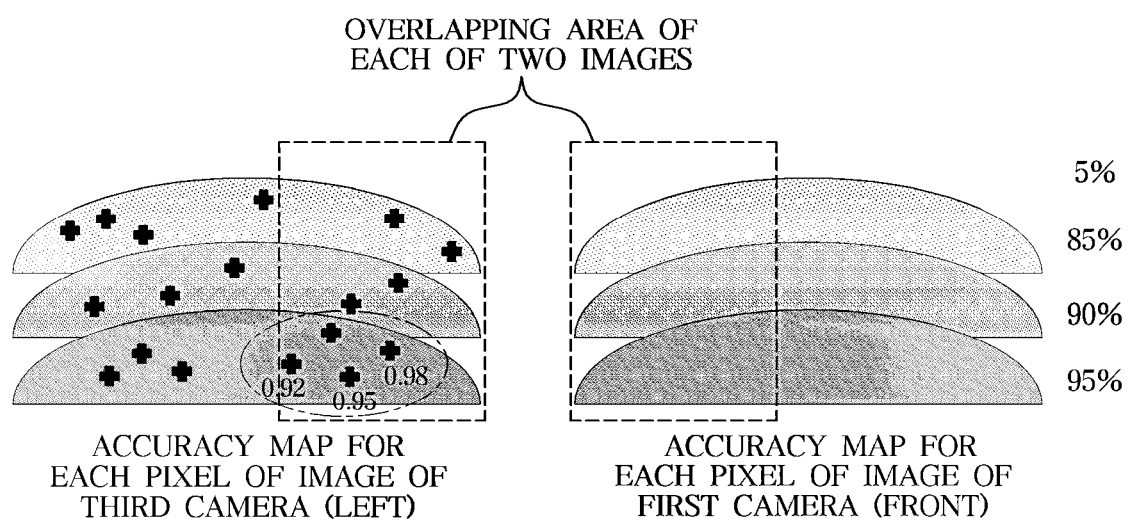
FIG. 7B shows an example of an accuracy map in an overlapping area.

As such, an accuracy map obtained by calculating the area-specific accuracy of the deep learning image recognition result and generating a distribution of accuracy is shown in FIG. 7B. FIG. 7B shows an example of an accuracy map in an overlapping area. After calculating the area-specific accuracy as described above with reference to FIG. 7A, the accuracy map for each area may be generated as shown FIG. 7B. As shown in FIG. 7B, for example, in terms of accuracy calculation on the area pd1, an accuracy distribution map for each camera may be generated in an overlapping area. To this end, a mean m and a variance v of each of a front image and a left image may be calculated as below.

Mean $m=(0.98+0.9+0.95+0.92)/4$

Variance $v=\{(0.98-m)^2+(0.9-m)^2+(0.95-m)^2+(0.92-m)^2\}/7$

A Gaussian distribution with the mean m and the variance v as above may be an accuracy of distance value table in the corresponding area.

In consideration of both an accuracy of a photographing area of the first camera (front) 110 and an accuracy of a photographing area of the third camera (left) 130, the accuracy (conditional probability P) of the distance value table in the corresponding overlapping area may be calculated by, $P$ (front accuracy, left accuracy|actual distance)=$P$ (front accuracy|actual distance)*$P$ (left accuracy|actual distance)

The above accuracy calculation of the distance value table may be performed with respect to all of the plurality of cameras 110, 120, 130, and 140, thereby obtaining a distance value table integrated as one and an accuracy map representing a distribution of the accuracy.

Figure 7C:
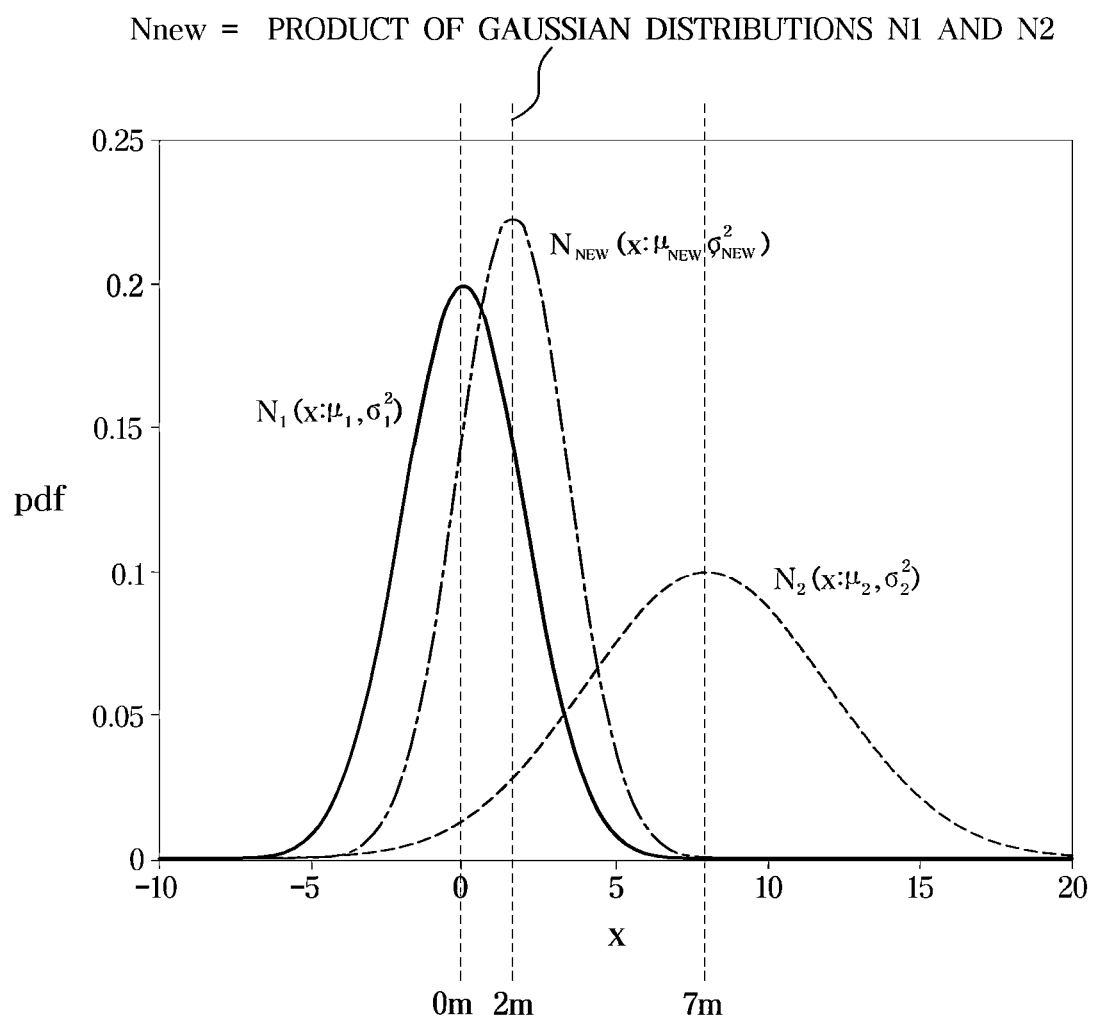
FIG. 7C shows an example of a Gaussian distribution of an accuracy map.

FIG. 7C shows an example of a Gaussian distribution of an accuracy map. Distance value error compensation for outputting a final distance value of a recognized object may be performed by distinguishing a matched object from an unmatched object. Here, 'matching' refers to that a single object is commonly recognized in two different images. A recognition result (e.g., location information) of an unmatched object is output as it is. A recognition result (e.g., location information) of a matched object is output after correcting a final distance using an accuracy map (distribution map) obtained by reflecting an accuracy of each recognition result.

If each of N1 and N2 is a distribution of accuracy of two cameras for an overlapping area, a result obtained by calculating the distributions N1 and N2 and multiplying N1 and N2 may be closer to a distribution with a smaller variance from among the two normal distributions. Through the above, a final distance may be effectively calculated (determined) by reflecting a value with a relatively higher accuracy in consideration of both accuracy normal distribution models of the two cameras.

If two pieces of location information for a single object exist (i.e., in matching) and an extreme value is obtained when the information is used alone because noise is greatly mixed in each data, the above-described calculation may have a smoothing effect that is not biased in one direction while effectively reducing noise.

In FIG. 7C, if object location information obtained from each camera is output as it is, 0 m and 7 m for N1 and N2 are obtained, respectively. However, if calculated by reflecting the two accuracy distributions, Nnew is 2 m, and a value with the highest probability may be output.

As such, before release of the vehicle 100, the distance value tables of the plurality of cameras 110, 120, 130 and 140 constituting the SVM camera 150 may be integrated into an integrated distance value table and the accuracy map is generated. Accordingly, if a customer purchasing the vehicle 100 actually drives the vehicle 100, location information of an object recognized through the SVM camera 150 may be calculated by referring to the integrated distance value table and the accuracy map, and thus more accurate location information of the recognized object may be calculated and output.

According to the disclosure, the integrated distance value table and the accuracy map may be applicable to a stereo camera including two cameras for three-dimensional (3D) image as well as the SVM camera 150. For example, by applying the integrated distance value table and the accuracy map according to the disclosure to an image of each of the two cameras constituting the stereo camera, a 3D image may be expressed more accurately.

According to the disclosure, the integrated distance value table and the accuracy map may be applicable to imaging devices with sensors such as a camera, a radar, a lidar, and/or the like, as well as the SVM camera 150. For example, by applying the integrated distance value table and the accuracy map according to the disclosure to object information obtained through each of the camera, radar, lidar, and/or the like, more accurate output may be acquired.

Meanwhile, the above features can be stored in the form of a non-transitory recording medium storing computer-executable instructions. The instructions may be stored in the form of a program code, and when executed by a processor, the instructions may perform operations of the disclosed features. The non-transitory recording medium may be implemented as a non-transitory computer-readable recording medium.

The non-transitory computer-readable recording medium may include all kinds of recording media in which instructions which may be decoded by a computer are stored of, for example, a read only memory (ROM), random access memory (RAM), magnetic tapes, magnetic disks, flash memories, optical recording medium, and/or the like.

Although examples have been described for illustrative purposes, those skilled in the art will appreciate that various modifications, combinations, additions and substitutions are possible, without departing from the scope and spirit of the disclosure. Therefore, examples have not been described for limiting purposes.

What is claimed is:

1. A method comprising:
    performing a calibration of a plurality of cameras mounted on a vehicle to obtain a parameter of each of the plurality of cameras;
    generating, based on the obtained parameter, a plurality of distance value tables representing a projection relationship between:
        pixel coordinates in an image of each of the plurality of cameras; and
        actual coordinates in surrounding area of the vehicle; and
    calculating, based on the plurality of distance value tables, an accuracy of actual distance coordinates included in the plurality of distance value tables for a specific area, and generating an accuracy map representing a distribution of the accuracy.

2. The method of claim 1, wherein an overlapping area of each of the plurality of cameras is recognized based on the calibration, and the accuracy is calculated on the overlapping area of each of the plurality of cameras.

3. The method of claim 2, further comprising:
    calculating an accuracy of a distance value table for an overlapping area formed by a first camera and a second camera in a form of conditional probability as:

$$P \text{ (first accuracy, second accuracy|actual distance)} = P \text{ (first accuracy|actual distance)} * P \text{ (second accuracy|actual distance)},$$ wherein the first camera has the first accuracy and the second camera has the second accuracy.

4. The method of claim 3, wherein an accuracy of each of the plurality of cameras is modeled by a Gaussian distribution having a mean and a variance of images of the respective camera.

5. The method of claim 1, wherein the parameter of each of the plurality of cameras is a pose parameter according to an installation location and an installation orientation of each respective camera.

6. The method of claim 1, wherein the image of each of the plurality of cameras is an image where recognition of an object located in the image has been completed.

7. The method of claim 6, wherein the object is a single object located in an overlapping area of images of at least two cameras of the plurality of cameras.

8. The method of claim 1, wherein a size of the image of each of the plurality of cameras, a size of each of the plurality of distance value tables, and a size of the accuracy map are equal to each other.

9. A vehicle comprising:
    a plurality of cameras of the vehicle to capture surroundings of the vehicle; and
    a controller configured to:
        perform a calibration of the plurality of cameras to obtain a parameter of each of the plurality of cameras;
        generate, based on the obtained parameter, a plurality of distance value tables representing a projection relationship between:
            pixel coordinates in an image of each of the plurality of cameras; and
            actual coordinates in surrounding area of the vehicle;
        calculate, based on the plurality of distance value tables, an accuracy of actual distance coordinates included in the plurality of distance value tables for a specific area; and
        generate an accuracy map representing a distribution of the accuracy.

10. The vehicle of claim 9, wherein the controller is configured to:
    recognize, based on the calibration, an overlapping area of each of the plurality of cameras; and calculate the accuracy on the overlapping area of each of the plurality of cameras.

11. The vehicle of claim 10, wherein the controller is further configured to calculate an accuracy of a distance value table for an overlapping area formed by a first camera and a second camera in a form of conditional probability as:

$P$ (first accuracy, second accuracy|actual distance)=$P$ (first accuracy|actual distance)*$P$ (second accuracy|actual distance), wherein the first camera has the first accuracy and the second camera has the second accuracy.

12. The vehicle of claim 11, wherein an accuracy of each of the plurality of cameras is modeled by a Gaussian distribution having a mean and a variance of images of the respective camera.

13. The vehicle of claim 9, wherein the parameter of each of the plurality of cameras is a pose parameter according to an installation location and an installation orientation of each respective camera.

14. The vehicle of claim 9, wherein the image of each of the plurality of cameras is an image where recognition of an object located in the image has been completed.

15. The vehicle of claim 14, wherein the object is a single object located in an overlapping area of images of at least two cameras of the plurality of cameras.

16. The vehicle of claim 9, wherein a size of the image of each of the plurality of cameras, a size of each of the plurality of distance value tables, and a size of the accuracy map are equal to each other.

17. A method comprising:
recognizing an object in an image captured by a plurality of cameras;
determining a location of the recognized object based on an accuracy map; and
generating a control signal for controlling driving of a vehicle based on the location of the recognized object,
wherein the accuracy map represents a distribution of an accuracy of actual distance coordinates included in a plurality of distance value tables for a specific area, the plurality of distance value tables representing a projection relationship between:
pixel coordinates in the image captured by the plurality of cameras; and
actual coordinates in surrounding area of the vehicle.

18. The method of claim 17, wherein the image captured by the plurality of cameras is an image where the recognizing the object in the image has been completed.

19. The vehicle driving control method of claim 18, wherein the recognized object is a single object located in an overlapping area of images captured by at least two cameras of the plurality of cameras.

20. The vehicle driving control method of claim 17, wherein a size of the image captured by the plurality of cameras, a size of each of the plurality of distance value tables, and a size of the accuracy map are equal to each other.

* * * * *